Aug. 12, 1958    J. WILLMES ET AL    2,846,944
APPARATUS FOR PRESSING FOODSTUFFS
Filed Dec. 14, 1953    7 Sheets-Sheet 1

INVENTORS
Josef WILLMES
Oskar BRAUN
BY:

Aug. 12, 1958  J. WILLMES ET AL  2,846,944
APPARATUS FOR PRESSING FOODSTUFFS
Filed Dec. 14, 1953  7 Sheets-Sheet 2

INVENTORS
Josef WILLMES
Oskar BRAUN
BY:

Aug. 12, 1958  J. WILLMES ET AL  2,846,944
APPARATUS FOR PRESSING FOODSTUFFS
Filed Dec. 14, 1953  7 Sheets-Sheet 3

INVENTORS
Josef WILLMES
Oskar BRAUN
BY:

Aug. 12, 1958   J. WILLMES ET AL   2,846,944
APPARATUS FOR PRESSING FOODSTUFFS
Filed Dec. 14, 1953   7 Sheets-Sheet 4

INVENTORS
Josef WILLMES
Oskar BRAUN
BY:

Aug. 12, 1958  J. WILLMES ET AL  2,846,944
APPARATUS FOR PRESSING FOODSTUFFS
Filed Dec. 14, 1953  7 Sheets-Sheet 5

INVENTORS
Josef WILLMES
Oskar BRAUN
BY:

Aug. 12, 1958    J. WILLMES ET AL    2,846,944
APPARATUS FOR PRESSING FOODSTUFFS
Filed Dec. 14, 1953    7 Sheets-Sheet 6
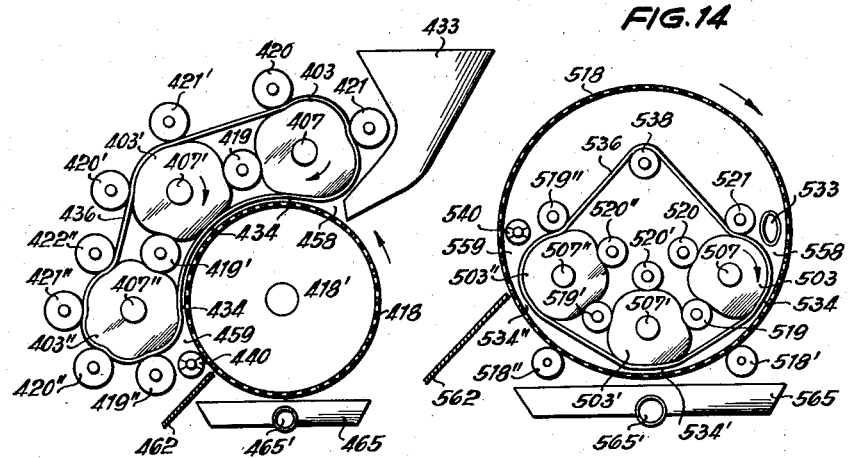
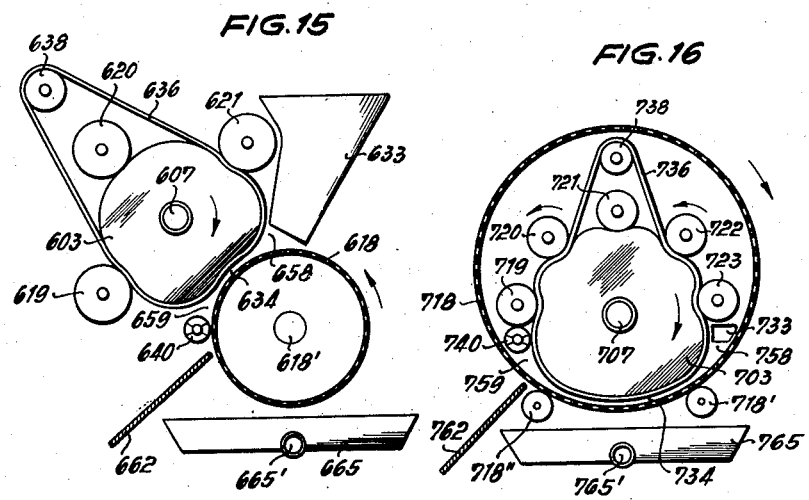
INVENTORS
Josef WILLMES
Oskar BRAUN
BY:

Aug. 12, 1958  J. WILLMES ET AL  2,846,944
APPARATUS FOR PRESSING FOODSTUFFS
Filed Dec. 14, 1953  7 Sheets-Sheet 7

INVENTORS
Josef WILLMES
Oskar BRAUN
BY

United States Patent Office 2,846,944
Patented Aug. 12, 1958

2,846,944

APPARATUS FOR PRESSING FOODSTUFFS

Josef Willmes, Bensheim an der Bergstrasse, and Oskar Braun, Bensheim-Auerbach, Germany Application December 14, 1953, Serial No. 398,152

Claims priority, application Germany December 13, 1952

4 Claims. (Cl. 100—153)

The present invention relates to food treating apparatus and more particularly to devices for pressing foodstuffs such as fruits and the like for extracting juices therefrom as well as for removing husks and kernels from foods. Also, the apparatus of the invention is of the type which may be used for milling, kneading and comminuting foods.

Known devices of the above type have yieldable rollers and the like for applying pressure to the foodstuffs, but these known devices have the disadvantage of being incapable of uniformly treating all of the foodstuffs. Thus, where the layer of foodstuffs is relatively thick, the known devices will apply a higher pressure than where the layer of foodstuffs is relatively thin. Furthermore, with the known devices it is not uncommon for pressure to be applied to the foodstuffs only at the points where the path through which the foodstuffs travel has a minimum cross section. Furthermore, where the foodstuffs are of a lumpy nature, the known devices will produce a sudden increase in pressure on the lumps of the foodstuffs, which is of a great disadvantage when undesirable juices are squeezed in this way from lumpy foodstuffs which are not intended to be crushed.

One of the objects of the present invention is to overcome the above drawbacks by providing an apparatus for pressing foodstuffs in a uniform manner.

A further object of the present invention is to provide a means for regulating the pressure with which the foodstuffs are pressed.

Another object of the present invention is to provide a means for cyclically varying the pressure applied against the foodstuffs.

An additional object of the present invention is to provide an apparatus which is capable of separating components of the treated foodstuffs from each other.

Still another object of the present invention is to provide an apparatus of the above type which is automatically cleaned during its operation.

A still further object of the present invention is to provide a foodstuff pressing apparatus which may be arranged horizontally or vertically.

Yet another object of the present invention is to provide an arrangement according to which a plurality of foodstuff pressing units may be arranged in series to successively press the foodstuffs.

A still additional object of the present invention is to provide an apparatus which is capable of applying a graduated or stepped pressure to foodstuffs.

Also, the objects of the present invention include the provision of an apparatus capable of accomplishing all of the above objects and at the same time being made up of simple and ruggedly constructed parts which are easy and inexpensive to manufacture and which assure reliable operation over a long period of time.

With the above objects in view the present invention mainly consists of an apparatus for pressing foodstuffs, this apparatus including a moving means which defines a pressure chamber for moving foodstuffs to be pressed through the pressure chamber, this moving means being flexible at a portion thereof which defines part of the pressure chamber. The apparatus further includes a means for applying the force of a fluid against the flexible portion of the moving means for the purpose of pressing the foodstuffs in the pressure chamber. More specifically, the apparatus of the invention includes a support means, a central roll and a plurality of peripheral rolls distributed along the periphery of the central roll, all of these rolls being turnably carried by the support means and at least one of the rolls having an elastic fluid-tight wall. A conduit means communicates with the interior of this one roll for supplying a fluid under pressure to the interior of the latter, and inner and outer conveyer belts are located against each other and between the central and peripheral rolls with the inner belt engaging the central roll and the outer belt engaging the peripheral rolls, the said one roll which contains the fluid under pressure urging the belts toward each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figs. 13–20 are respectively side, elevational, diagrammatic views of various food pressing arrangements which may be provided in accordance with the present invention, Figs. 17–20 respectively showing arrangements similar to Figs. 13–16 but without conveyer belts.

Figure 1:
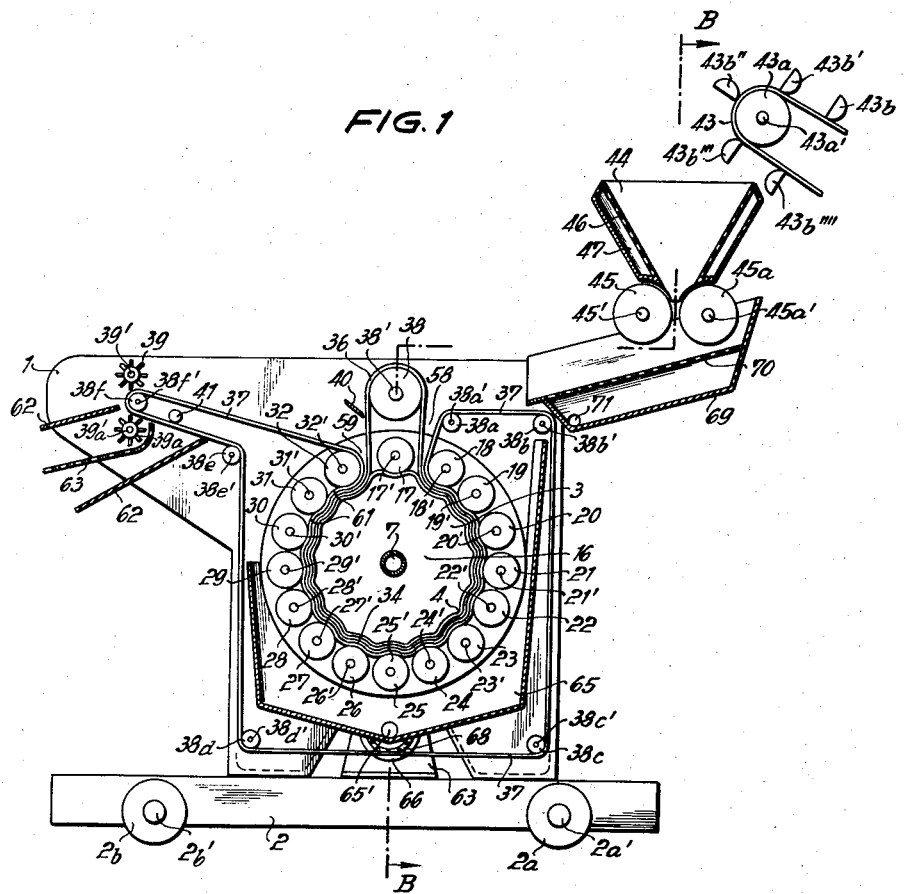
Fig. 1 is a partly sectional, partly fragmentary side elevational view of an apparatus constructed in accordance with the present invention and is taken along section line A—A of Fig. 2 in the direction of the arrows.
Figure 2:
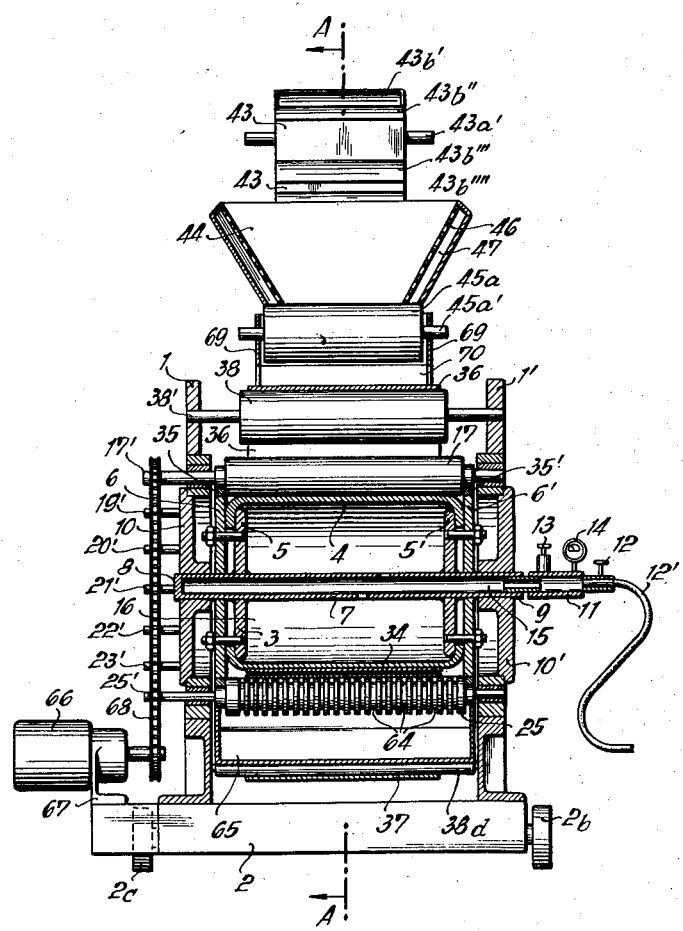
Fig. 2 is a view of the apparatus of Fig. 1 taken along line B—B of Fig. 1 in the direction of the arrows.
Figure 3:
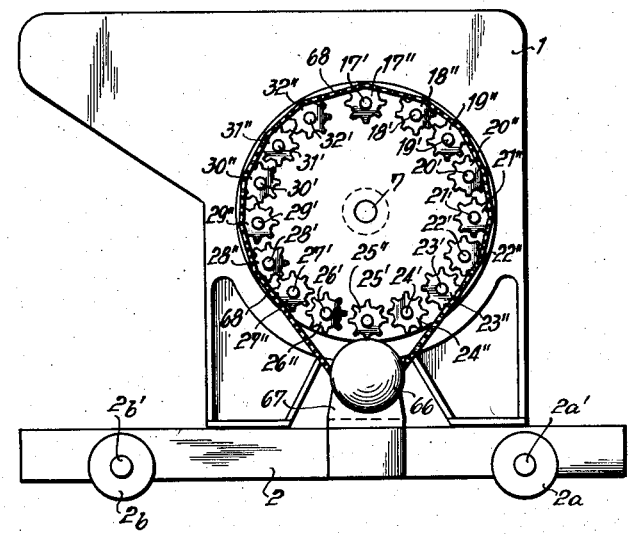
Fig. 3 is a side elevational view of the apparatus as seen from the left side of Fig. 2.

Referring now to the drawings and more particularly to Figs. 1–3, it will be seen that the apparatus of the invention includes a frame 2 carried by the rollers 2a and 2b which are mounted on the shafts 2a' and 2b' which are turnable in the frame 2, this frame having a pair of side walls 1 and 1' which turnably carry a central roll 3. This central roll 3 has the form of a hollow cylinder and has a flexible elastic wall 4 made of rubber or any other material which is flexible, resilient, and fluid-tight. The flexible cylindrical wall 4 is fixed to the rigid end walls 5 and 5' of the roll 3 (Fig. 2) by means of the rings 6 and 6' which are pulled by bolts or the like toward the walls 5 and 5', respectively, so as to compress and tightly grip the ends of the cylindrical member 4 and in this way render the interior of the roll 3 fluid-tight. A plurality of peripheral rolls 17-32 are arranged along the periphery of the central roll 3 and are turnably carried by the walls 1 and 1', the axes of all of the rolls being parallel. As is apparent from Fig. 1, when a fluid is located in the interior of roll 3, the wall 4 thereof tends to enter into the spaces between the peripheral rolls 17-32, and thus the wall 4 assumes a fluted, corrugated shape, as shown in Fig. 1, so that in this way the roll 3 is provided with depressions and projections 61 at its outer surface.

A hollow shaft 7 extends through the roll 3 along the axis thereof (Fig. 2) and is welded to the end plates 5 and 5' of the roll 3. The ends 8 and 9 of the shaft 7 extend beyond the end plates of roll 3 and are respectively mounted for turning movement in the bearings 10 and 10' carried by the walls 1 and 1'. A tube 11 communicates with the interior of shaft 7 through a suitable stuffing box, or the like, which enables shaft 7 to rotate with respect to tube 11 while preventing fluid from escaping between shaft 7 and tube 11, and a conduit means 12' communicates through a valve 12 with tube 11 and shaft 7, this valve 12 being adapted to admit and discharge fluid under pressure into and from the interior of the roll 3. A safety valve 13 is provided on tube 11 and is adapted to automatically open when a predetermined maximum pressure is reached, and a pressure gauge 14 also is mounted on tube 11 for indicating pressure of the fluid in the interior of the roll 3, the shaft 7 being provided in the interior 16 of roll 3 with apertures which provide communication between the interior 16 of roll 3 and the interior 15 of shaft 7.

The several peripheral rolls 17-32 are respectively fixed to the shafts 17'-32' which are turnably carried by the walls 1 and 1' in the manner shown for the rolls 17 and 25 in Fig. 2. The peripheral rolls are provided with annular grooves 64, shown only on the roll 25 in Fig. 2. The space between the central roll 3 and the peripheral rolls 17-32 is the pressure chamber 34 which is laterally limited by the rings 35 and 35' fixed to the plates 6 and 6', respectively, and slidably engaging the end faces of the rolls 17-32, in the manner shown in Fig. 2.

The conveyer belts 36 and 37 enter into the pressure chamber 34 between the rolls 17 and 18 and leave the pressure chamber 34 between the rolls 32 and 17. At the exterior of the pressure chamber 34, the inner conveyer belt 36 is guided by the roll 38 located directly over the roll 17 on a shaft 38' carried by the end walls 1 and 1', and the outer conveyor belt 37 is guided at the exterior of the pressure chamber 34 by the rolls 38a-38f which are respectively carried by shafts 38a'-38f' which also are turnably carried by the side walls 1 and 1'. These conveyer belts may be made of any suitable material. For the purpose of extracting juices and the like, the inner belt 36 is made of a fluid-tight elastic material such as rubber, and the outer belt 37 is made of a substantially non-yieldable, flexible, foraminous material such as a fiber or wire mesh, a perforated band of metal or other suitable material, or out of a plurality of linked members. However, it is also possible to make the outer belt 37 of an elastic fluid-tight material if this belt is provided with grooves, corrugations, or ribs which allow the extracted liquid to flow to the sides of the belt. For the purpose of holding the conveyer belts in tension the rolls 17-32 and the guide rolls 38 and 38a-38f may be resiliently or adjustably mounted in any known way.

Brushes 39 and 39a are respectively mounted on shafts 39' and 39a', carried by the walls 1 and 1', adjacent to the upper left end of belt 37, as viewed in Fig. 1, for cleaning this belt, and a scraper 40 is provided adjacent an upper left portion of belt 36, as viewed in Fig. 1, for cleaning belt 36, the brushes and scraper serving to remove pressed material from these belts. A blower device 41 is provided adjacent the upper left portion of belt 37, as viewed in Fig. 1, this blower device 41 being provided with a number of nozzles which direct compressed air through the openings of the foraminous belt 37 in order to clean and dry the latter.

In the space between rolls 17 and 18, the belts 36 and 37 approach each other along lines which form a relatively sharp, small acute angle to provide an entrance 58 for carrying the foodstuffs into the pressure chamber 34, the rolls 38 and 18 being arranged in such a way as to locate the part of belt 36 between the same in a vertical plane. At the region where the belts 36 and 37 leave the pressure chamber 34, they form an angle which is larger than the angle of entrance 58, for example an angle of 45°, to provide a larger exit 59, and at this point the roll 38 cooperates with roll 32 to locate the part of belt 36 between the same also in a substantially vertical plane. From the exit 59, the belt 37 moves to the brushes 39 and 39a where plates 62 are provided to carry away foodstuffs separated from the belt 37. Also, a sieve 63 which is adapted to be vibrated is located between the plates 62.

A trough 65 is carried by the side wall 1 and is arranged beneath the rolls which define pressure chamber 34 and above the lowermost run of belt 37, this trough 65 receiving extracted juices and having a discharge conduit 65'.

In order to carry foodstuffs to the apparatus of the invention, an endless conveyer belt 43 having buckets 43b is carried by guide rolls 43a which are in turn carried by the shafts 43a', this conveyer being fragmentarily shown at the upper right hand part of Fig. 1 as well as at the top of Fig. 2. The buckets drop the foodstuffs to be treated into the hopper 44 at a substantially uniform rate, and the rolls 45 and 45a, respectively carried by shafts 45' and 45a', serve to move the foodstuffs from the bottom end of hopper 44 to the top of sieve 70 which is inclined downwardly toward the upper right hand part of belt 37 so that the foodstuffs move downwardly along sieve 70 to the belt 37. One or both of the rolls 45 and 45a may be driven by any suitable motor or the like. Because of the weight of the foodstuffs in hopper 44 and because of manual pressure which may be applied to foodstuffs in the hopper 44, a certain amount of juice is extracted from the foodstuffs in the hopper, and to carry away this juice the hopper 44 is provided with inner foraminous walls 46 spaced from the outer walls of the hopper to form chambers 47 which communicate with suitable ducts for carrying away juice from the hopper itself. The rollers 45 and 45a serve to prepress the foodstuffs, and the juice extracted by rollers 45 and 45a passes through sieve 70 into the trough 69 from which the juice is carried away by the duct 71.

As is most clearly shown in Figs. 2 and 3, the frame 2 is provided with a bracket 67 which carries the motor 66 whose shaft carries a sprocket wheel meshing with chain 68 which also meshes with sprocket wheels 17''-23'' and 27''-32'' fixed to the shafts 17'-23' and 27'-32', respectively, so that when the motor 66 operates the rolls 17-23 and 27-32 are driven. Rolls 18-23 and 27-32 move belt 37 by frictional engagement therewith and belt 36 is moved by frictional engagement with belt 37, roll 3 being in turn rotated by frictional engagement with belt 36 and being directly driven by roll 17. The rolls 24-26 are turned by frictional engagement with belt 37.

The above described structure operates in the following manner:

Upon operation of motor 66, or upon turning of chain 68 by hand, if desired, the rolls and conveyer belts are moved in the manner described above, assuming that the valve 12 has been set to produce the desired pressure in the interior of roll 3. The belt 37 carries the pre-pressed material from sieve 70 to the entrance 58 to the pressure chamber 34, and at the end of this entrance 58 the foodstuffs are nipped between the belts 36 and 37 and carried into and through the pressure chamber 34 to the exit 59 where the pressed material is carried away from the apparatus. As they travel through the pressure chamber 34, the foodstuffs are uniformly and continuously subjected at every part of the pressure chamber to the pressure of the central roll 3 whose wall 4 presses against the elastic inner belt 36 and as a result urges the latter and the foodstuffs toward the outer belt 37 whose outer movement is resisted by the rolls 18–32 so that the projections and corrugations are formed from one peripheral roll to the next. The juice extracted from the foodstuffs moves along the grooves 64 or through other suitable cutouts in the peripheral rolls 17–32 and through the foraminous belt 37 down to the trough 65 from where the juices are carried away. If the outer belt 37 is made of a fluid-tight material and provided with grooves, ribs or the like, then the extracted juice flows from the sides of belts 36 and 37 and falls from the latter into the trough 65.

Because of the projections 61 formed between the rolls 17–32, these projections having a size determined by the pressure in the roll 3 and the belts 36 and 37 necessarily conforming to the corrugated outer surface of roll 3, the foodstuffs in the pressure chamber 34 are alternately moved along convex and concave paths. In this way the foodstuffs are thoroughly milled during passage through the pressure chamber 34 so that the individual particles of food are constantly changing their position in the layer of food which moves through the pressure chamber, and in this way the best possible extraction of juice is provided. In removing the hulls from fruits this action provided by the apparatus of the invention very efficiently separates the hulls from the kernels.

The material which leaves the pressure chamber 34 and which does not of itself become separated from the belts 36 and 37 is removed from these belts by the scraper 40 and brushes 39, respectively, and delivered to the plates 62 and the vibrating sieve 63, which may be vibrated by any suitable eccentric arrangement or the like.

Figures 4, 5:
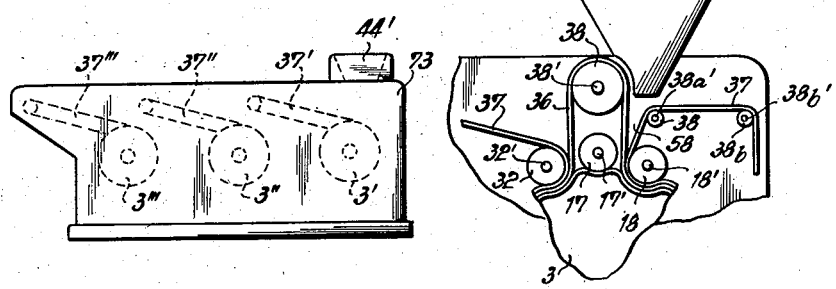
Fig. 4 is a diagrammatic illustration of a different embodiment of the invention.
Fig. 5 is a fragmentary elevational view showing another arrangement for the supply hopper of the embodiment of Figs. 1–3.

Fig. 4 shows an arrangement according to which several roll assemblies 3', 3", 3'" are carried by the walls 73 of a frame 72. These roll assemblies cooperate with the belt assemblies 37', 37", and 37'", and foodstuffs to be pressed are delivered to the roll assembly 3' by the hopper 44'. The belt assembly 37' carries food from the roll assembly 3' to the roll assembly 3", and the belt assembly 37" carries the food from the roll assembly 3" to the roll assembly 3'", the belt assembly 37'" delivering the food in its finally treated condition from the apparatus of Fig. 4. With such an arrangement, it is possible to provide the roll assembly 3" with a higher pressure than the roll assembly 3' and the roll assembly 3'" with a higher pressure than the roll assembly 3", so that in this way the food is subjected to a stepped, graduated pressure.

According to the arrangement shown in Fig. 5, the supply hopper 44 is arranged directly over the entrance to the pressure chamber 34 of the embodiment of Figs. 1–3, the structure of Fig. 5 being otherwise identical with that of Figs. 1–3. Such an arrangement is also shown in Fig. 4.

Figure 6:
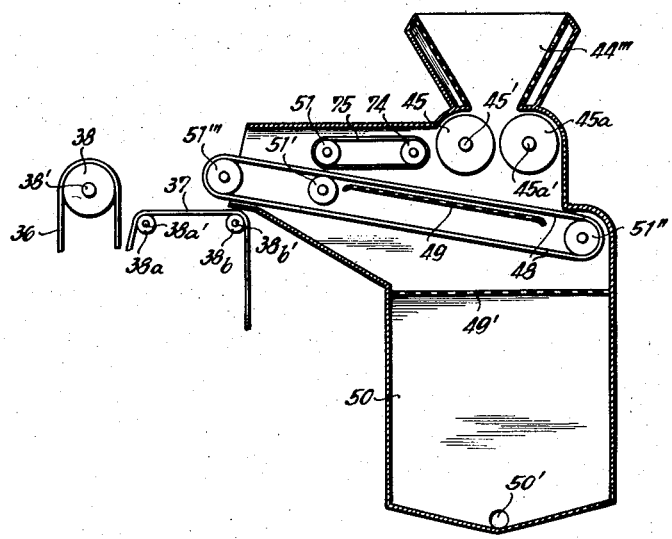
Fig. 6 is a side, sectional, partly fragmentary view of still another arrangement for supplying foodstuffs to the apparatus of Figs. 1–3.

According to the embodiment of the invention shown in Fig. 6, all of the structure of Figs. 1–3 is the same except for the apparatus for supplying the foodstuffs to the belt 37 prior to entry of the foodstuffs into the pressure chamber 34. The embodiment of Fig. 6 is particularly suited for a high degree of juice extraction before entry of the foodstuffs to the pressure chamber 34. According to this embodiment, the foodstuffs move from hopper 44'" through the rolls 45 and 45a to be pressed thereby and are thus delivered onto a foraminous conveyer belt 48 carried and guided by the rolls 51', 51", and 51'". This belt thus permits the juice to fall to the sieves 49 and 49' and from the latter into the collection chamber 50 which is provided with a discharge conduit 50'. For an improved extraction of juice, an endless band 75 is guided on the rolls 51 and 74. The foodstuffs which remain on the top surface of belt 48 are carried by the latter between the rolls 51 and 51' where they are additionally subjected to pressure, and then the belt 48 delivers the foodstuffs to the belt 37 to be carried thereby to the pressure chamber 34 in the manner shown in Figs. 1–3.

Figure 7:
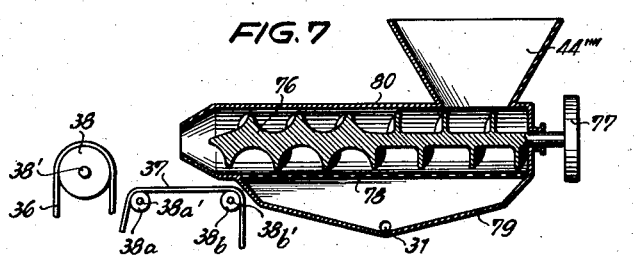
Fig. 7 is a fragmentary, side, sectional view showing yet another arrangement for supplying foodstuffs to the apparatus of Figs. 1–3.

Fig. 7 shows still another arrangement for supplying foodstuffs to the apparatus of Figs. 1–3. According to Fig. 7 a worm 76 is arranged in the housing 80 beneath the hopper 44"", this housing 80 being tubular and having an open outlet end located over the belt 37. A pulley 77 is fixed to the worm 76 to drive the latter through any suitable belt drive or the like, and a sieve 78 is arranged beneath the worm 76 so that only juices pass through this sieve. These juices are collected in the trough 79 and carried off by the duct 81, while the material remaining on the top side of sieve 78 is delivered by the worm 76 and tube 80 to the belt 37 to be carried by the latter into the pressure chamber 34, as shown in Figs. 1–3.

Figure 8:
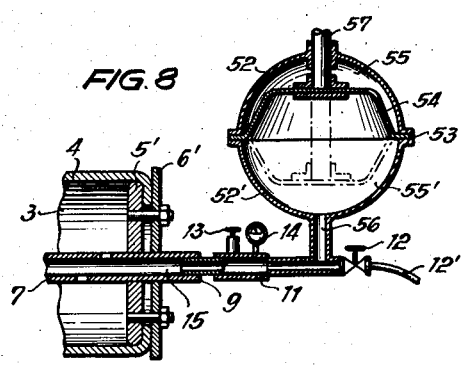
Fig. 8 is a fragmentary, sectional, elevational view of an arrangement for cyclically varying the pressure applied to the foodstuffs with the embodiment of Figs. 1–3.

As was mentioned above, the successive convex and concave portions of the pressure chamber 34 provides a superior milling and kneading action. This action may be augmented by cyclically varying the pressure within the roll 3, and such a cyclical variation of pressure may be produced by the structure fragmentarily illustrated in Fig. 8 and shown connected between the valve 12 and tube 11, the apparatus to the left of tube 11 in Fig. 8 being identical with that of Figs. 1–3. A piston pump arrangement may be provided to cyclically vary the pressure of the roll 3 during operation of the apparatus, but in the example of Fig. 8 a diaphragm pump arrangement is provided, this arrangement taking the form of a membrane 54 fixed between a pair of hemispherical hollow members 52 and 52', the member 52' being provided with a tubular duct 56 communicating with the valve 12 and tube 11, while a rod 57 passes through the member 52 and is fixed to the membrane 54 for reciprocating the latter by any suitable drive means, from the upper solid line position shown in Fig. 8 to the lower dot-dash line position shown in Fig. 8. As is apparent from Fig. 8, the diaphragm 54 divides the space enclosed by members 52 and 52' into an upper chamber 55 and a lower chamber 55'. It is believed to be apparent that during reciprocation of rod 57, the membrane 54 will be moved downwardly to the dot-dash position of Fig. 8 to decrease the volume of chamber 55 so as to increase the pressure within the roll 3 and will then be moved up to the solid line position shown in Fig. 8 to increase the volume of chamber 55' and in this way decrease the pressure within the roll 3 so that the pressure of this roll 3 is cyclically varied in this manner to augment the milling and kneading action already provided by the corrugated periphery of roll 3. Any suitable eccentric drive means may be used for reciprocating the rod 57. It is also possible to provide one or more of the peripheral rolls 17–32 with a construction similar to that of roll 3 and to cyclically vary the pressure in such peripheral rolls with a construction similar to that shown in Fig. 8.

Figure 9:
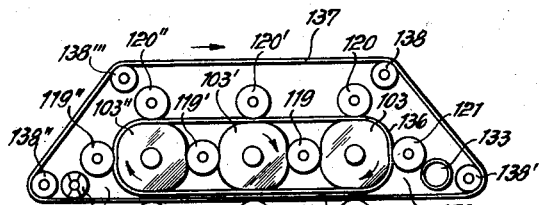
Fig. 9 is a diagrammatic side elevational view of a different embodiment of an apparatus for pressing foodstuffs.

According to the embodiment of the invention shown in Fig. 9 the outer conveyer belt 137 is guided by the rolls 138–138'" and surrounds the inner conveyer belt 136 which in turn surrounds the central pressure rolls 103–103" which are constructed in the same way as roll 3 described above. A plurality of pressure rolls 119–119" cooperate with the rolls 103–103" to compress the latter, the rolls 119 and 119' being common to a pair of the rolls 103-103". Additional pressure rolls 120-120" are provided to cooperate with the rolls 103-103", respectively, and a fourth additional pressure roll 121 cooperates with roll 103. It will be noted that only pressure rolls 119 and 119' are located within the belt 136, while the latter passes between rolls 103-103" and the rolls 119", 120", 120', 120, and 121. Further pressure rolls 118-118" engage the outer face of belt 137 and are respectively located opposite the rolls 103-103".

The material to be treated is supplied to the inner face of belt 137 at the lower right end thereof, as viewed in Fig. 9, by the supply duct 133, and the lower run of belt 137 moves to the left, as viewed in Fig. 9, to carry the material to be treated through the entrance region 158 into the pressure chamber 134 located between rolls 103-103" and rolls 118-118", the material being carried away from the pressure chamber 134 by the belt 137 at the exit end 159 of the pressure chamber. Extracted juice falls to the trough 165 and is discharged with the duct 165'. Also, a screw member 140 engages the belt 137 immediately after exit 159 to withdraw the treated food from the belt 137.

Figure 10:
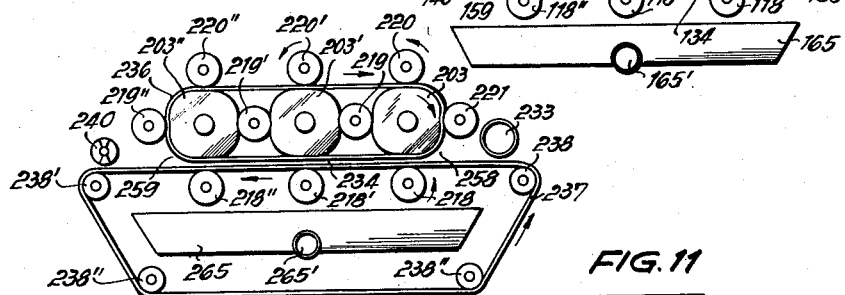
Fig. 10 is a diagrammatic side elevational view of a variation of the arrangement shown in Fig. 9.

The embodiment of Fig. 10 is similar to that of Fig. 9 except that the belt 237 extends about the trough rather than about the central rolls. All parts of the construction of Fig. 10 which correspond to those of Fig. 9 are indicated with the same reference characters as those of Fig. 9 except that the first digit of each reference character is "2" instead of "1." Thus, it will be seen that the rolls 238" and 238''' are arranged below the trough 265 to guide belt 237 about the latter. With the embodiment of Fig. 10 the food to be supplied is delivered from the outlet of the supply means 233 to the top run of belt 237 and is carried to the left, as viewed in Fig. 10, through the entrance 258 into the pressure chamber 234 and along the latter to the exit 259 after which food is removed from the belt 237 by the rotating screw 240 which scrapes the surface of belt 238.

With the embodiments of Figs. 9 and 10 the worms 140 and 240 deliver the treated food to any desired means for carrying the food to a convenient location for further operations to be performed thereon, and the pressure rolls 119", 121, and 120-120" of Fig. 9 and 219", 221, and 220-220" of Fig. 10 may be driven by sprocket wheels and a chain in a manner similar to the arrangement shown in Figs. 1-3. Also, the rolls 103-103" and 203-203" may be provided with a fluid under pressure in the same manner as described above in connection with Figs. 1-3. Thus, with the embodiments of Figs. 9 and 10 it is possible in a very simple way to step up and graduate the pressure applied to the food stuff by regulating the pressures within the several rolls 103-103" and 203-203".

Figure 11:
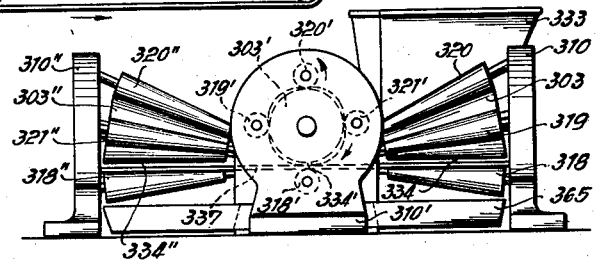
Fig. 11 is a side elevational view of a further embodiment of an apparatus for pressing foodstuffs in accordance with the principles of the invention.
Figure 12:
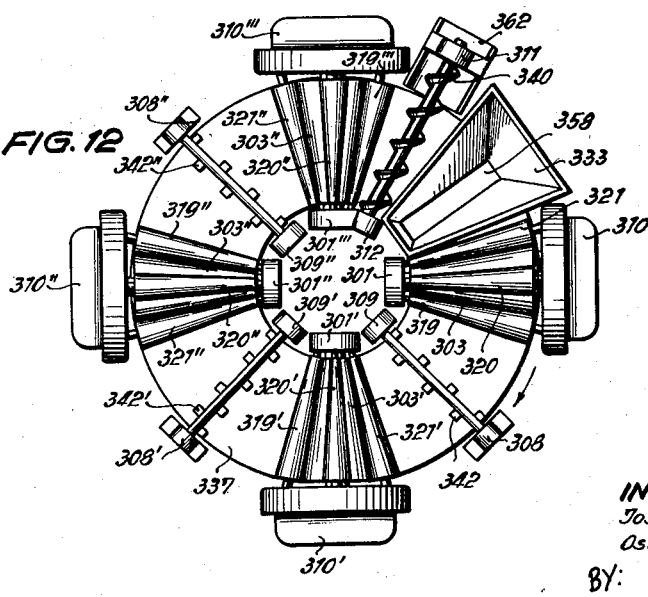
Fig. 12 is a top plan view of the structure of Fig. 11.

According to the embodiment of the invention shown in Figs. 11 and 12, a plurality of stationary frame members 301-301''' respectively cooperate with frame members 310-310''' to respectively turnably support the central pressure rolls 303-303'''. Beneath these pressure rolls, these frame members respectively support for turning movement the peripheral pressure rolls 318-318''', only the pressure rolls 318-318" being visible in the drawings. A foraminous rigid annular plate 337, which may, for example, be perforated, is located between and in engagement with the rolls 303-303''' and 318-318'''. At the top side of plate 337, the frame members 301 and 310 turnably carry the rolls 319-321 which are distributed about and engage the outer periphery of roll 303; the frame members 301' and 310' turnably carry the pressure rolls 319'-321' which are distributed about and engage the periphery of pressure roll 303'; the frame members 301" and 310" turnably carry the rolls 319"-321" which are distributed about and engage the roll 303"; and the frame members 301''' and 310''' turnably carry the pressure rolls 319'''-321''' which are distributed about and engage the outer periphery of roll 303'''.

Pairs of additional inner frame members 309-309" respectively cooperate with outer frame members 308-308" to turnably support loosening device 342-342", respectively, in the manner shown most clearly in Fig. 12, these loosening devices taking the form of shafts having projections thereon for loosening the foodstuffs located on the top side of the plate 337. The foodstuffs to be treated are supplied to the entrance region 358 of the first pressure chamber 334, formed between roll 303 and plate 337, by a hopper 333, and as the plate 37 rotates about its center in a clockwise direction, as viewed in Fig. 12, the foodstuffs are loosened up by the device 342, then pass through the pressure chamber 334', are then loosened up by the loosening device 342', then pass through the pressure chamber 334", are then loosened up by the loosening device 342", and finally pass through the last pressure chamber, formed between roll 303''' and plate 337. After leaving this last pressure chamber, the foodstuffs are removed from the top side of plate 337 by the rotating screw 340 which scrapes against the top side of plate 337, this screw 340 being turnably carried by stationary members 311 and 312, the frame member 311 carrying a discharge plate 362 which receives the foodstuffs from the worm 340.

Beneath the plate 337 and the rolls 318-318''' is located an annular trough 365 which receives the juices which pass through the foraminous plate 337, and these juices are carried away from the trough 365 by any suitable duct or the like. The plate 337 is carried only by the rolls 318-318''', and the several rolls 303-303''' have resilient outer walls and are provided with a fluid under pressure in any of the manners described above so that in this way the plate 337 is maintained in engagement with the rolls 318-318''' and compresses the foodstuffs against the rolls 303-303'''. Any suitable drive means may be provided to rotate rolls 318-318''' and/or any of the other rolls, the plate 337 turning by frictional engagement with rolls 318-318'''. Also, any suitable motors or the like may be provided to rotate the several loosening devices 342-342" and the screw 340. Thus, with the embodiment of Figs. 11 and 12 an exceedingly simple, compact arrangement having no conveyer belts is provided for successively moving the foodstuffs through a plurality of pressure chambers whose pressures may be stepped up in any desired graduations by suitably regulating the pressures in the several central rolls 303-303'''.

Fig. 13 diagrammatically illustrates an arrangement which combines several units of the type shown in Figs. 1-3 with a common outer roll having a foraminous wall, this arrangement requiring only one inner conveyer belt, the outer conveyer belt of Figs. 1-3 being omitted. Referring to Fig. 13 it will be seen that the several central rolls 403-403" are turnably carried by shafts 407-407" and are similar to the roll 3 in that the central rolls of Fig. 13 may have the pressure therein regulated and are provided with outer resilient walls. Pressure roll 419 is located between and in engagement with the rolls 403 and 403', while pressure roll 419' is in engagement with and located between 403' and 403". A belt 436 extends about and is in engagement with the rolls 403-403", and the several pressure rolls 419", 420", 421", 422", 420', 421', 420 and 421 engage the outer face of belt 436 and press the latter into the rolls 403-403" in the manner shown in Fig. 13. A hopper 433 is provided to supply the material to be treated to the entrance region 458 of the pressure chamber 434 defined between belt 436 and the outer periphery of the roll 418 turnably carried by shaft 418' and having a foraminous outer wall made of a rigid material. At the discharge end 459 of the pressure chamber 434 a screw cleaner 440 is provided to remove the treated foodstuffs from the outer surface of roll 418 and deliver the same to the plate 462. During passage of the foodstuffs through the pressure chamber, the extracted juices fall through the perforations of roll 418 into the trough 465 located beneath the roll 418, and these extracted juices are carried off from the trough 465 by the duct 465'.

Fig. 14 shows an arrangement similar to that of Fig. 13, the principal difference being that the foraminous rigid roll surrounds the other rolls. The parts of the embodiment of Fig. 14 which respectively correspond to the parts of the embodiment of Fig. 13 are indicated with the same reference characters except that the first digit of these reference characters is "5" instead of "4." Except for the following differences, the structure of Fig. 14 is the same as that of Fig. 13:

The rolls 520–520" directly engage the rolls 503–503" and the belt 536 is guided over an additional roll 538. The foraminous roll 518 surrounds the belt 536 and forms the pressure chambers 534, 534' and 534" therewith. The material to be treated is supplied to the entrance 558 of the pressure chamber 534 by any suitable supply means having the outlet 533, and the worm 540 is located at the inner periphery of roll 518 at the exit 559 of pressure chamber 534" for removing material from the roll 518 and delivering material to the plate 562 which is located behind the plane in which the remaining structure of Fig. 14 is shown. The roll 518 is in the form of a cylinder having open ends and is supported for turning movement by the rolls 518' and 518". Any suitable structure may be provided for driving the apparatus shown in Figs. 13 and 14, such as sprocket chains or the like connected to some of the rolls shown in Figs. 13 and 14, and the pressure in the several central rolls 403–403" and 503–503" may be regulated in any desired way so as to step up the pressure, for example, as the material being treated passes from one pressure chamber to the next pressure chamber.

Fig. 15 shows an arrangement which is similar to that of Fig. 13 in all respects except that only one pressure roll 603 is provided. The parts of Fig. 15 which respectively correspond to the parts of Fig. 13 are indicated with the same reference characters except that the first digit of each character is "6" instead of "4." Thus, it will be seen that pressure rolls 620 engage the outer surface of the central roll 603 which is surrounded by belt 636, the latter being guided by roll 638. The rolls 619 and 621 engage the outer face of belt 636 and urge the latter against the resilient periphery of roll 603. As is apparent from Fig. 15, the material to be treated is supplied from hopper 633 to the entrance end 658 of pressure chamber 634 and moves from the latter to the discharge region 659 after which the cleaner 640 removes material from the outer periphery of the foraminous roll 618 and delivers the material to the plate 662, the extracted juices falling through the perforations of roll 618 into the trough 665.

The embodiment of Fig. 16 bears the same relationship to the embodiment of Fig. 15 that the embodiment of Fig. 14 bears to Fig. 13, in that with the embodiment of Fig. 16 the foraminous roll 718 surrounds the remaining rolls, with the exception of the rolls 718' and 718" which turnably support the foraminous roll 718. The parts of Fig. 16 which respectively correspond to the parts of Figs. 14 and 15 are indicated with the same reference characters except that in the case of Fig. 16 the first digit is "7." The operation of the structure of Fig. 16 is believed to be obvious. The material supplied from outlet 733 moves through the entrance 758 to the pressure chamber 734 provided between belt 736 and roll 718 and after arriving at the discharge end 759 of pressure chamber 734 the material is removed from the inner surface of roll 718 by the rotating screw 740 which delivers the material to the plate 762, the extracted juices falling through the perforations of roll 718 into the trough 765.

Figs. 17–20 show embodiments of the invention which include no endless belts.

Figure 17:
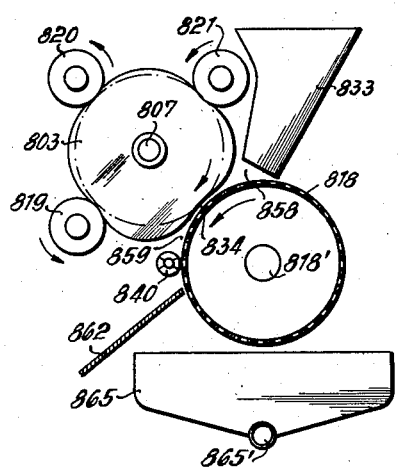

The embodiment of Fig. 17 is identical in all respects with that of Fig. 15 except that the belt 636 and the guide roll 638 therefor are omitted. The parts of Fig. 17 which respectively correspond to the parts of Fig. 15 are indicated with the same reference characters except that in the case of Fig. 17 the first digit of all of the reference characters is "8" rather than "6," and the operation of the embodiment of Fig. 17 is identical with that of Fig. 15, except that the foodstuffs in passing through the pressure chamber 834 as well as the entrance 858 and exit 859 of the pressure chamber come into direct contact with the roll 803.

Figure 18:
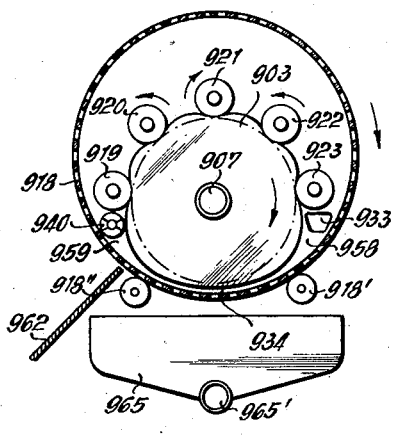

Fig. 18 shows an embodiment of the invention which is identical with that of Fig. 16 except that belt 736 and guide roll 738 of Fig. 16 are eliminated. The parts of Fig. 18 which respectively correspond to the parts of Fig. 16 are indicated with the same reference characters except in the case of Fig. 18 the first digit of each reference character is "9" instead of "7." It is believed to be apparent that the operation of the embodiment of Fig. 18 is identical with that of Fig. 16 except that the foodstuffs directly engage the roll 903 during passage through the pressure chamber 934 and the entrance 958 and exit 959 of the pressure chamber.

Figure 19:
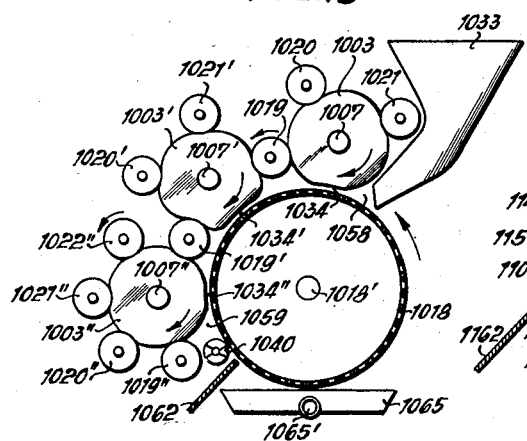

Fig. 19 shows an embodiment of the invention which is identical in all respects with that of Fig. 13 except that the belt 436 of Fig. 13 is eliminated, and the parts of Fig. 19 which respectively correspond to the parts of Fig. 13 are indicated with the same reference characters except that the first digits "4" of the reference characters of Fig. 13 are replaced by "10." The operation of the embodiment of Fig. 19 is identical with that of Fig. 13 except that in passing through the pressure chamber entrance 1058, the pressure chambers 1034, 1034', 1034", and the pressure chamber exit 1059, the foodstuffs come into direct contact with the central rolls 1007, 1007', and 1007".

Figure 20:
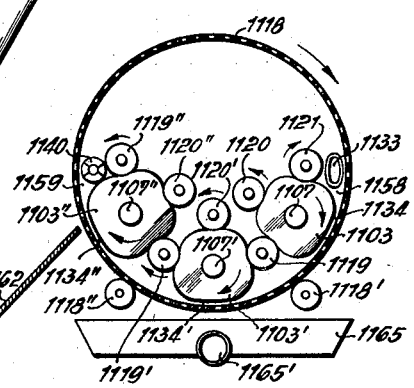

Fig. 20 shows an embodiment which is identical in all respects with that of Fig. 14 except that the belt 536 and guide roll 538 of Fig. 14 are omitted, the parts of Fig. 20 which respectively correspond to the parts of Fig. 14 being indicated with the same reference characters except that the first digit "5" of the reference characters of Fig. 14 is replaced by "11." The operation of the embodiment of Fig. 20 is identical with that of Fig. 14 except that in passing through the pressure chamber entrance 1158, the pressure chambers 1134, 1134' and 1134", and the pressure chamber exit 1159, the foodstuffs come into direct contact with the central pressure rolls 1103–1103".

Of course, with the embodiments of Figs. 17–20, the central rolls are in direct engagement with the pressure rolls which in the embodiments of Figs. 13–16 press the belts against the central rolls.

It will be understood that each of the elements described above, or two or more together, may also find a useful application in other types of apparatus for pressing foodstuffs differing from the types described above.

While the invention has been illustrated and described as embodied in an apparatus for uniformly pressing foodstuffs, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be secured by Letters Patent is:

1. Apparatus for pressing foodstuffs, comprising, in combination, support means; a central roll and a plurality of rigid peripheral rolls distributed spaced from each other all along the periphery of said central roll, all of said rolls being turnably carried by said support means for turning movement about fixed axes, and a central roll having an elastic fluid-tight wall; conduit means communicating with the interior of said central roll for supplying a fluid under pressure to the interior of the latter; inner and outer conveyer belts located against each other and between said central and peripheral rolls, said inner belt engaging said central roll and said outer belt engaging said peripheral rolls, said central roll urging said belts toward each other and urging the portions of said belts located between adjacent peripheral rolls into the free spaces between said rolls; and guide means mounted on said support means and guiding said belts for movement toward each other at one region between adjacent peripheral rolls along lines forming an acute angle and for movement away from each other at another region between adjacent peripheral rolls along lines forming an angle larger than said acute angle.

2. Apparatus for pressing foodstuffs, comprising, in combination, support means; a central roll and a plurality of peripheral rolls distributed along the periphery of said central roll, all of said rolls having depressions in their outer surfaces and being turnably carried by said support means for turning movement about fixed axes, respectively and at least one of said rolls having an elastic fluid-tight wall; conduit means communicating with the interior of said one roll for supplying a fluid under pressure to the interior of the latter; and inner and outer conveyer belts located against each other and between said central and peripheral rolls, said inner belt engaging said central roll and said outer belt engaging said peripheral rolls and said one roll urging said belts toward each other.

3. Apparatus for pressing foodstuffs, comprising, in combination, support means; a central roll and a plurality of peripheral rolls distributed along the periphery of said central roll, all of said rolls being turnably carried by said support means for turning movement about fixed axes, respectively and at least one of said rolls having an elastic fluid-tight wall; conduit means communicating with the interior of said one roll for supplying a fluid under pressure to the interior of the latter; inner and outer conveyer belts located against each other and between said central and peripheral rolls, said inner belt engaging said central roll and said outer belt engaging said peripheral rolls and said one roll urging said belts toward each other; and means operatively connected to said conduit means for cyclically varying the pressure of a fluid in said one roll.

4. Apparatus for pressing foodstuffs, comprising, in combination, support means; a central roll and a plurality of peripheral rolls distributed along the periphery of said central roll, all of said rolls being turnably carried by said support means for turning movement about fixed axes, respectively and at least one of said rolls having an elastic fluid-tight wall; conduit means communicating with the interior of said one roll for supplying a fluid under pressure to the interior of the latter, said conduit means extending along the axis of said one roll; valve means connected to said conduit means for admitting and discharging fluid into and from said one roll; safety valve means operatively connected to said conduit means for limiting the fluid pressure in said one roll; a pressure gauge operatively connected to said conduit means for indicating the pressure in said one roll; and inner and outer conveyer belts located against each other and between said central and peripheral rolls, said inner belt engaging said central roll and said outer belt engaging said peripheral rolls and said one roll urging said belts toward each other.

References Cited in the file of this patent

UNITED STATES PATENTS

| | | |
|---|---|---|
| 445,856 | Malhoit et al. | Feb. 3, 1891 |
| 761,878 | Cooley | June 7, 1904 |
| 814,987 | Richardson | Mar. 13, 1906 |
| 1,869,987 | Van Denburg | Aug. 2, 1937 |
| 2,135,763 | Nicholson | Nov. 8, 1938 |
| 2,142,932 | Beard | Jan. 3, 1939 |
| 2,144,793 | Christensen | Jan. 24, 1939 |
| 2,281,860 | Renault | May 5, 1942 |
| 2,365,658 | Schumacher | Dec. 19, 1944 |
| 2,514,321 | Fekete | July 4, 1950 |

FOREIGN PATENTS

| | | |
|---|---|---|
| 20,537 | Great Britain | 1913 |
| 1,049,205 | France | Aug. 12, 1953 |